(12) United States Patent
Leroy

(10) Patent No.: US 11,921,007 B2
(45) Date of Patent: Mar. 5, 2024

(54) FIXING SYSTEM FOR HOUSING FOR MEASURING CHARACTERISTICS OF A TIRE

(71) Applicant: COMPAGNIE GENERALE DES ETABLISSEMENTS MICHELIN, Clermont-Ferrand (FR)

(72) Inventor: Vianney Leroy, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 148 days.

(21) Appl. No.: 17/311,613

(22) PCT Filed: Oct. 28, 2019

(86) PCT No.: PCT/IB2019/059211
§ 371 (c)(1),
(2) Date: Jun. 7, 2021

(87) PCT Pub. No.: WO2020/115581
PCT Pub. Date: Jun. 11, 2020

(65) Prior Publication Data
US 2022/0018734 A1 Jan. 20, 2022

(30) Foreign Application Priority Data

Dec. 7, 2018 (FR) ..................... 1872511

(51) Int. Cl.
*G01M 17/02* (2006.01)
*B60C 11/24* (2006.01)
(Continued)

(52) U.S. Cl.
CPC ......... *G01M 17/021* (2013.01); *B60C 11/246* (2013.01); *E01F 9/529* (2016.02);
(Continued)

(58) Field of Classification Search
CPC ............ G01M 17/021; G01M 17/0074; B60C 11/246; B60C 11/243; E01F 9/529;
(Continued)

(56) References Cited

U.S. PATENT DOCUMENTS 8,267,003 B1 * 9/2012 Lou ..................... F41H 5/013
89/929
10,113,855 B2 10/2018 Ledoux et al.
(Continued)

FOREIGN PATENT DOCUMENTS

DE 4115014 A1 3/1992
EP 0919763 A1 6/1999
(Continued)

OTHER PUBLICATIONS

International Search Report dated Jan. 17, 2020, in corresponding PCT/IB2019/059211 (5 pages).

*Primary Examiner* — Eric S. McCall
*Assistant Examiner* — Timothy P Graves
(74) *Attorney, Agent, or Firm* — VENABLE LLP

(57) ABSTRACT

A ground attachment system (1) for a tire characteristics detection unit (15) comprises an attachment plate (2) comprising a plurality of recesses (3) distributed over the surface of the attachment plate, a plurality of frustoconical clamping rings (4), and a plurality of cylindrical guide tunnels (5) arranged in the detection unit (15), the clamping rings (4) and the guide tunnels (5) each comprising a complementary conical portion (6, 7) converging towards the attachment plate (2) when the ring (4) is in the clamping position in a tunnel (5).

7 Claims, 1 Drawing Sheet

(51) Int. Cl.
- *E01F 9/529* (2016.01)
- *F16B 5/02* (2006.01)
- *F16B 7/18* (2006.01)
- *G01B 7/26* (2006.01)
- *G01M 17/007* (2006.01)

(52) U.S. Cl.
CPC ............... *F16B 7/187* (2013.01); *G01B 7/26* (2013.01); *G01M 17/0074* (2013.01); *F16B 5/0241* (2013.01); *F16B 5/025* (2013.01)

(58) Field of Classification Search
CPC ........ F16B 7/187; F16B 5/0241; F16B 5/025; F16B 43/00; G01B 7/26; G01B 5/0002
See application file for complete search history.

(56) References Cited

U.S. PATENT DOCUMENTS

| | | |
|---|---|---|
| 11,598,623 B2 | 3/2023 | Leroy |
| 2016/0153763 A1 | 6/2016 | Ledoux et al. |
| 2017/0030806 A1 | 2/2017 | Lee |
| 2018/0216644 A1* | 8/2018 | Mateo .................. F16B 5/04 |
| 2021/0025783 A1 | 1/2021 | Leroy et al. |
| 2021/0372761 A1 | 12/2021 | Leroy |

FOREIGN PATENT DOCUMENTS

| | | |
|---|---|---|
| EP | 2148126 A1 | 1/2010 |
| FR | 3007517 B1 | 12/2014 |
| JP | 10-184803 A | 7/1998 |
| WO | 2014/202747 A1 | 12/2014 |
| WO | 2019/034968 A1 | 2/2019 |

\* cited by examiner

FIXING SYSTEM FOR HOUSING FOR MEASURING CHARACTERISTICS OF A TIRE

TECHNICAL FIELD OF THE INVENTION

The present invention relates to a ground attachment system for a unit for detecting the characteristics of tyres, the attachment of the unit being designed so as to be able to withstand the significant stresses associated with having numerous vehicles drive over the unit, said ground attachment system comprising an attachment plate comprising a plurality of recesses distributed over the surface of the attachment plate, a plurality of frustoconical clamping rings and a plurality of cylindrical guide tunnels arranged in the detection unit.

PRIOR ART

Document WO 2014202747 describes a system for measuring the thickness of a layer of rubbery material of a tyre. It takes the form of a unit that is to be attached to the ground. In use, this type of unit is subject to high stresses on account of numerous vehicles of all types, including heavy-duty vehicles, driving over it. Despite these significant stresses, the unit must not move or lift. The units are therefore often attached to the ground by means of significant infrastructure in the ground. This infrastructure involves major work, which is both time-consuming and costly. Moreover, if a unit proves to be badly positioned, any repositioning also requires major work, involving heavy equipment. There is therefore a need to make it possible to easily fasten and reposition the measurement units, with simplified implementation.

Document FR3007517 describes a system for measuring the thickness of a layer of rubber for a tyre. This system uses a static magnetic field source and an element for measuring the magnetic field. Such a system is intended to be installed in a unit over which the vehicles drive. The measurements are taken when the wheels pass over the unit. The unit must be able to withstand significant loads. The load stresses are linked to the number of vehicles driving over the unit, and to their weight. Furthermore, malfunctioning of the various electronic elements can be caused in particular by vibrations while the vehicles drive over.

Document US 2017030806 describes a tread depth measuring system comprising a tread measuring apparatus, a processor, a support and a warning apparatus. The tread measuring apparatus is positioned on the ground and configured to measure a tread depth. The support is a plate placed on the ground, above a pit where the measuring elements are placed. This measurement method makes it necessary to provide a complex and expensive installation with a cavity specifically made in the ground in order to be able to install the system there.

The invention provides various technical means for remedying these various drawbacks.

SUMMARY OF THE INVENTION

First of all, a first objective of the invention is to provide an attachment system for a tyre characteristics measurement unit which is simple and quick to install in the ground.

Another objective of the invention is to provide an attachment system for a tyre characteristics measurement unit that is economical and easily industrializable.

Another objective of the invention is to provide an attachment system for a tyre characteristics measurement unit that does not interfere with the operation of the measurement unit.

Another object of the invention is to provide an attachment system for a tyre characteristics measurement unit that makes it possible to easily and quickly move the unit laterally in a plurality of potential locations.

To do this, the invention provides a ground attachment system for a unit for detecting characteristics of tyres, the attachment of the unit being designed so as to withstand the significant stresses associated with having numerous vehicles drive over the unit, said ground attachment system comprising:

i) an attachment plate comprising a plurality of recesses distributed over the surface of the attachment plate;
ii) a plurality of frustoconical clamping rings;
iii) a plurality of cylindrical guide tunnels arranged in the detection unit;

said attachment system being characterized in that the clamping rings and the guide tunnels each comprise a complementary conical portion converging towards the attachment plate when the ring is in the clamping position in a tunnel.

The solution makes it possible to attach the various elements of the detection system without play. The absence of play or the presence of minimal play helps reduce the sources of premature wear of the system. The various elements being held firmly ensures good operational qualities. The attachment is also durable. The elimination of assembly clearances make it possible to limit abrasion wear and therefore to guarantee a long service life. The solution is simple and easy to industrialize. It comprises few parts. In addition, assembly and installation operations are simple. These characteristics make it possible to create a very simple, inexpensive and robust attachment system.

According to one advantageous embodiment, the conical portion of each of the rings is shaped on the external profile of said rings, in the median portion of this profile.

According to another advantageous embodiment, the conical portion of each of the tunnels is shaped on the internal profile of the tunnels, at the exit from said tunnel. The tunnel exit area corresponds to the junction area between the tunnel and the attachment plate.

Advantageously, the cylindrical tunnels are integral with the detection unit. For example, the tunnel is drilled directly into the mass of the unit. This embodiment is simple and inexpensive to produce.

Also advantageously, the cylindrical tunnels are inserts secured in holes provided for this purpose in the detection unit.

This embodiment makes it possible to provide a specific material for the insert, different from the material of the unit, for example a steel or brass ring inserted and adhesively bonded into a unit made of thermosetting material.

According to one advantageous embodiment, the level of clamping of each of the clamping rings is adjusted by a screw passing through the ring and cooperating with an attachment plate.

According to another advantageous embodiment, the clamping of each of the rings is adjusted by a screw passing through the ring and cooperating with a nut arranged in the attachment plate.

This is a simple, reliable system, allowing rapid installation with easy adjustment of the level of clamping.

The invention also provides an assembly for detecting tyre characteristics, comprising an electronic unit for detecting tyre characteristics, and a system for attaching to the ground.

DESCRIPTION OF THE FIGURES

All the embodiment details are given in the description which follows, which is supplemented by FIGS. 1 to 5, which are given solely by way of non-limiting examples and in which.

DETAILED DESCRIPTION OF THE INVENTION

Tyre Characteristics Measurement Unit

Figure 1:
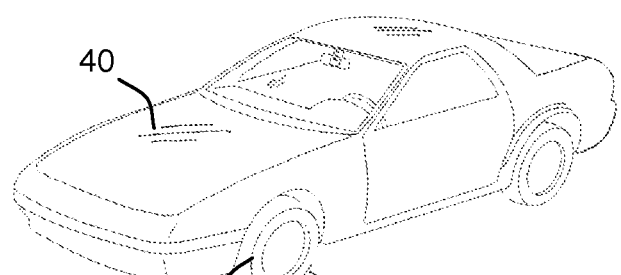
FIG. 1 is a perspective view of an example of a tyre characteristics detection assembly.
Figure 2:
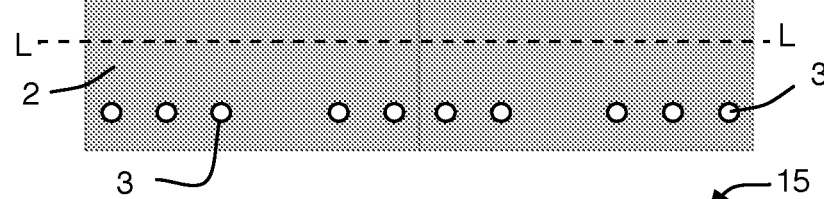
FIG. 2 is a top view of an exemplary attachment plate.
Figure 3:
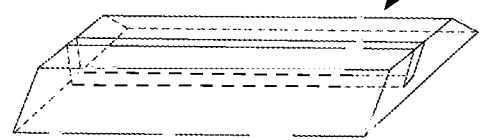
FIG. 3 is a perspective view of an exemplary electronic unit for detecting characteristics of tyres.

FIG. 1 illustrates an example of a known assembly 30 for measuring the thickness of a layer of rubbery material of a tyre 41 of a vehicle 40, such as that described in document FR3007517. The assembly 30 comprises an electronic unit 15 for detecting characteristics of tyres and an attachment plate 2 as illustrated in FIGS. 2 and 3. When the vehicle 40 is driving over the electronic tyre characteristics detection unit 15, sensors make it possible to carry out one or more measurements, such as measurements of the tread thickness of the tyre 41. To carry out the measurements, the device is preferably placed in a location that makes it easy for the vehicles 40 to drive over it. The manner in which the unit is attached is therefore advantageously designed to withstand the significant stresses associated with many vehicles driving over it. These stresses require reliable and durable fastening, as described in the following figures.

FIG. 2 illustrates an example of an attachment plate 2. In this example, the plate is divided into two parts joined to each other to provide a larger width. The attachment plate 2 is fixed to the ground by a conventional means, such as for example a layer 21 of adhesive. The plate has a plurality of recesses 3. In the example illustrated, the recesses 3 are aligned in the longitudinal direction of the plate, parallel to the edges and spaced apart regularly. Each of the 3 recesses can accommodate a frustoconical clamping ring 4 (described later in relation to FIGS. 4 and 5). The length of the attachment plate 2 is preferably greater than that of the electronic tyre characteristics detection unit 15 that is to be attached, and the number of recesses 3 is greater than the number of frustoconical clamping rings 4 that are to be housed in order to allow the unit 15 to be positioned at a plurality of locations along the longitudinal axis L-L of the attachment plate 2. The geometry of the attachment plate 2 and the installation method then make it possible to easily reposition the system by a few centimetres to best match the statistical distribution of the drive-over events, which becomes known once the system has been in use for a time.

FIG. 3 illustrates an exemplary embodiment of an electronic tyre characteristics detection unit 15. In the example, this unit is in the form of a bevelled slab in order to make it easier for the vehicle 40 to get on and off the unit. A slot can be arranged in the unit 15 in order to make it possible to carry out the measurements.

Attaching the Unit to the Plate

Figure 4:
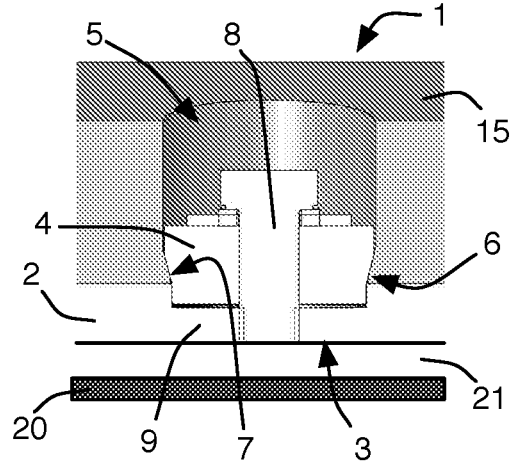
FIG. 4 is a schematic sectional representation of an exemplary attachment system for a tyre characteristics measurement unit.
Figure 5:
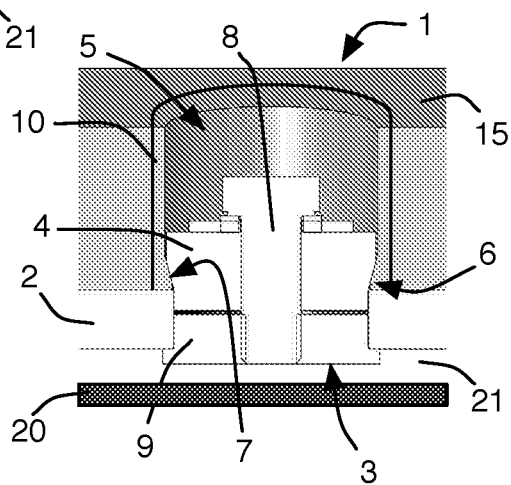
FIG. 5 is an alternative embodiment of the attachment system of FIG. 4.

FIGS. 4 and 5 illustrate an exemplary embodiment of the attachment system 1. In these examples, the unit 15 is attached to the plate 2 by means of a plurality of frustoconical clamping rings 4 inserted into the same number of cylindrical guide tunnels 5, whose shapes and dimensions match those of the rings 4. These complementary shapes and dimensions are provided so as to allow easy positioning of the rings 4 in the tunnels before tightening, then to provide double-action clamping when the clamping screw 8 is put in place and tightened.

Each ring has an annular body, with an axial bore for inserting a clamping screw 8. The external profile of a ring comprises a conical portion 6, extending over all or part of the lateral face of the ring. In the examples illustrated in FIGS. 4 and 5, the conical portion 6 is arranged in the median zone of the ring, i.e. substantially at mid-height of the outer periphery. To allow attachment of a unit 15 without axial play, and without radial play, the unit comprises a plurality of cylindrical guide tunnels 5 distributed over the surface of the unit in order to provide a plurality of attachment points. Each of the tunnels consists of a through-opening provided in the unit. In the examples illustrated, the internal profile of the tunnels is cylindrical, with a conical portion 7 provided in the vicinity of the face of the unit which is in contact with the plate 2 when the unit 15 is attached to the latter.

Thus, by virtue of this complementary architecture of the rings 4 and the tunnels 5, the frustoconical clamping rings 4 and the cylindrical guide tunnels 5 comprise a complementary conical portion 6, 7 converging towards the attachment plate 2. A clamping screw 8, passing through the ring 4 and screwing directly into the plate 2 (which is drilled and threaded for that purpose) or into a nut 9 provided under the plate, makes it possible to attach the unit so that the clamping exerts a holding force that is both axial and radial. The axial clamping force pushes the unit against the mounting plate. The radial clamping force acts uniformly over the entire circumference of the ring and produces a holding force over the entire internal face of the tunnel. The material of the ring is advantageously chosen to deform slightly under the action of the tightening of the screw 8, so as to press on the conical portion 7 of the tunnel over 360°.

Drilled-Hole Tunnel or Ring Tunnel

Depending on the type of embodiment provided, the cylindrical tunnel 5 may be integral with the detection unit 15, as illustrated in the example of FIG. 4. In this case, the tunnel is for example produced by drilling into the unit. As a variant, the cylindrical tunnels 5 are provided in inserts 10 secured in the unit 15, as illustrated in the example of FIG. 5. This embodiment allows tunnels to be made with a material different from that of the unit.

Operating Principle of the Magnetic Sensor for Measurement of Tyre Characteristics The sensor of known type makes it possible to measure the thickness of a layer of rubbery material of a tyre, for example the tread. In a conventional manner, such a layer has a face joined to an adjacent reinforcement produced with at least one material with a magnetic permeability greater than the magnetic permeability of air and a free face in contact with the air. The sensor is designed to measure the distance between the joined face and the free face of the layer of rubbery material.

The sensor has a static magnetic field source and a sensitive element, the output signal of which depends on the level of the local magnetic field, disposed such that the magnetic field strength measured by the sensitive element varies when the distance to be measured decreases.

The thicknesses of the tread have a very small thickness to be measured. Consequently, the measurement needs to be extremely precise.

In order to ensure a precise and reliable measurement, it is necessary for the different elements that make up the measurement chain to be held perfectly, if possible without play or with as little play as possible. The slightest play between the elements of the sensor and/or between the elements of the sensor and the unit could impair the quality or reliability of the measurements. As previously described, the elements are secured so as to minimize vibrations and/or movement of the parts of the system.

Materials

The solution is sized to withstand the braking of a truck at 70 km/h, and to withstand hundreds of thousands of axle drive-over events. The choices of material and geometry of the frustoconical clamping ring 4 and of the cylindrical tunnel 5 and of the plate 2 are provided to withstand mechanical stresses, in particular shearing, compression, and hammering effects.

The plate is advantageously made using a thermosetting material that has low water absorption and is resistant to hydrocarbons. The choice of a thermosetting material makes it possible to have excellent electrical permittivity, magnetic permeability and low dielectric losses.

The attachment plate 2 is advantageously made of polyester, preferably reinforced with glass fiber (GPO3). GPO3 is also a material having low surface tension, good porosity and good affinity to many bonding resins.

The frustoconical clamping rings 4 are advantageously made of polyamide, preferably PA 66, which is advantageous on account of its resilience, low flow and chemical resistance.

A material is preferably provided for the plate 2 of higher hardness than that of the frustoconical clamping ring 4, which makes it possible to obtain a degradation of the rings 4 before that of the plate 2. Indeed, the replacement of the frustoconical clamping rings 4 is simple and economical compared to that of the plate 2.

| Reference numerals employed in the figures | |
|---|---|
| 1 | Ground attachment system for unit |
| 2 | Attachment plate |
| 3 | Recess |
| 4 | Frustoconical clamping ring |
| 5 | Cylindrical guide tunnel |
| 6 | Conical ring portion |
| 7 | Conical tunnel portion |
| 8 | Screw |
| 9 | Nut |
| 10 | Insert |
| 15 | Measurement unit (for example for measuring tyre characteristics) |
| 20 | Coating |
| 21 | Adhesive |
| 30 | Assembly for detecting tyre characteristics |
| 40 | Vehicle |
| 41 | Tyre |

The invention claimed is:

1. A tire characteristics detection assembly comprising:
a unit for detecting tire characteristics; and
a ground attachment system for a unit for detecting characteristics of tires, the attachment of the unit being configured so as to withstand stresses associated with having numerous vehicles drive over the unit,
wherein the ground attachment system comprises:
(i) an attachment plate comprising a plurality of recesses distributed over a surface of the attachment plate;
(ii) a plurality of frustoconical clamping rings; and
(iii) a plurality of cylindrical guide tunnels arranged in the unit, and
wherein the frustoconical clamping rings and the cylindrical guide tunnels each comprise a complementary conical portion converging toward the attachment plate when the frustoconical clamping ring is in a clamping position in a tunnel.

2. The tire characteristics detection assembly according to claim 1, wherein the conical portion of each of the frustoconical clamping rings is shaped in a median portion of an external profile of the frustoconical clamping rings.

3. The tire characteristics detection assembly according to claim 1, wherein the conical portion of each of the cylindrical guide tunnels is shaped on an internal profile of the cylindrical guide tunnels at an exit from the tunnel.

4. The tire characteristics detection assembly according to claim 1, wherein the cylindrical guide tunnels are integrally formed with the unit.

5. The tire characteristics detection assembly according to claim 1, wherein the cylindrical guide tunnels are inserts fixed in holes in the unit.

6. The tire characteristics detection assembly according to claim 1, wherein a level of clamping of each of the frustoconical clamping rings is adjusted by a screw passing through the frustoconical clamping ring and cooperating with an attachment plate.

7. The tire characteristics detection assembly according to claim 1, wherein clamping of each of the frustoconical clamping rings is adjusted by a screw passing through the frustoconical clamping ring and cooperating with a nut arranged in the attachment plate.

* * * * *